Patented Feb. 1, 1944

2,340,696

UNITED STATES PATENT OFFICE 2,340,696

METHOD OF PURIFICATION OF POLYMERIZED ROSINS AND ROSIN ESTERS

Alfred L. Rummelsburg, Wilmington, Del., assignor to Hercules Powder Company, Wilmington, Del., a corporation of Delaware No Drawing. Application September 28, 1942, Serial No. 459,972

14 Claims. (Cl. 260—97)

This invention relates to the purification of polymerized rosins and rosin esters and more particularly to an improved method of purifying polymerized rosins or rosin esters which have been polymerized by means of strong polybasic mineral acid or organic substituted polybasic mineral acid catalysts.

In the polymerization of rosins and rosin esters with acid catalysts such as strong polybasic mineral acids and organic substituted polybasic mineral acids it is necessary to remove the catalyst from the polymerized product in the purification thereof. The presence of even small amounts of the acid catalyst in the final product leads to decomposition and discoloration of the polymerized product in many of the uses thereof. Removal of the acid catalyst has been accomplished in prior art processes by washing the solution of the polymerized material in a suitable solvent with water. Due to the unsaturated character of the polymerized rosin or rosin ester the acids used for the polymerization, particularly the strong polybasic mineral acids or organic substitution products thereof, exhibit a tendency to form addition products at the unsaturated bonds of the rosin material. Thus, in the case of sulfuric acid an addition product corresponding to a sulfate is formed. The presence of such addition products in the polymerized mixture seriously handicaps the washing operation for removal of the acid. They behave as emulsifying agents during a washing procedure and therefore make it very difficult and in some cases impossible to effect a separation between the water layer and the solvent solution of the polymerized rosin or rosin ester. The emulsions which they form require long periods of standing before they break and thereby considerably lengthen the time required for the washing operation as well as materially reducing the effective separation of the polymerized material from the wash solution. In the commercial production of polymerized rosin or rosin esters utilizing as catalysts such strong polybasic mineral acids as form the addition product with the rosin or rosin ester, the formation of emulsions in the washing operation has been a factor of such severity as to seriously handicap the production.

It is an object of this invention to provide an improved method of purification of polymerized rosins or rosin esters which have been polymerized by use of strong polybasic mineral acid or organic substituted polybasic mineral acid catalysts. It is a further object to provide an improved and more efficient means of removing catalyst from polymerized rosins or rosin esters which have been polymerized by means of strong polybasic mineral acids or organic substituted polybasic mineral acids. It is a more particular object to provide an improved and more efficient means of removing sulfuric acid from a polymerized rosin or rosin ester which has been polymerized by means of this acid as a catalyst. Other objects of the invention will appear hereinafter.

The above objects are accomplished in accordance with this invention by subjecting a polymerized rosin or rosin ester which has been polymerized by means of a strong polybasic mineral acid or organic substituted polybasic mineral acid prior to a water washing step to a hydrolysis treatment with an aqueous solution of an acid salt of an inorganic acid at a temperature which is sufficient to effect substantially complete hydrolysis of any addition product formed by combination of the polymerization catalyst with the rosin or rosin ester material. On completion of the hydrolysis treatment the acid salt solution is removed and the polymerized rosin or rosin ester solution washed with water to substantially completely remove the polymerizing acid and the acid salt used in the hydrolysis treatment. As a direct result of the hydrolysis treatment the water washing step is accomplished without appreciable emulsion formation and a clean separation is easily effected. A materially simplified procedure and an improved yield of polymerized product is thereby obtained. In addition, a polymerized product substantially completely free of traces of the polymerizing acid is made possible. This is of particular importance in relation to use of sulfuric acid since sulfur contamination in even very small amounts has an adverse effect.

The hydrolysis treatment described in accordance with this invention may be applied to the products obtained by polymerization of any of the various grades of rosin or any of the various rosin esters obtained by contact with a strong polybasic mineral acid or an organic substituted polybasic mineral acid as polymerization catalyst.

Thus the hydrolysis treatment may be applied to the various grades of either wood or gum rosin or to esters of such rosins as for example the methyl, ethyl, propyl, butyl, ethylene glycol, diethylene glycol, glycerol, pentaerythritol, etc. esters, which have been polymerized by contact with polymerization catalysts such as for example sulfuric acid, phosphoric acid, tetraphosphoric acid, methyl sulfuric acid, ethyl sulfuric acid, acetyl sulfuric acid, acetyl phosphoric acid, ethyl prosulfuric acid, benzyl sulfuric acid, etc. The polymerization of rosins and rosin esters with such catalysts is usually carried out on the rosin or rosin ester dissolved in a suitable organic solvent such as for example gasoline, benzene, toluene, cyclohexane, chloroform, ethylene dichloride, dichloroethyl ether, tetrachloroethane, decahydronaphthalene, etc.

The acid salts of inorganic acids which may be used in the form of aqueous solutions thereof in the hydrolysis treatment may be an acid salt of the particular acid used in the polymerization treatment. By the term "acid salt" herein and in the claims is meant a salt which behaves as an acid and which contains one or more ionizable hydrogen atoms. Such acid salts provide an acid reaction in aqueous medium. Typical acid salts which are useful in the hydrolysis treatment are sodium acid sulfate, sodium acid phosphate, disodium acid phosphate, potassium acid sulfate, monopotassium acid phosphate, dipotassium acid phosphate, sodium acid borate ($NaH_2BO_3$), as well as equivalents thereof. The concentration of the aqueous solution of the acid salt may vary up to as high as 60% by weight and may even be as low as 1% by weight, or in some cases even lower. Preferably the concentration of the acid salt will be in the range of about 5% to about 50% by weight. The amount of the aqueous solution of an acid salt of an inorganic acid used in the hydrolysis treatment may vary over wide ranges and will include amounts from about $\frac{1}{10}$ to about 10 times the volume of the polymerized rosin or rosin ester solution.

The time required to effect satisfactory hydrolysis will depend to a certain extent on the concentration of the acid salt and on the temperature of treatment. It is usually necessary to employ temperatures above about 50° C. to effect the desired hydrolysis, and temperatures up to as high as 200° C. are contemplated. When the temperature of hydrolysis is above the boiling point of the solvent in which the polymerized rosin or rosin ester is dissolved the treatment is carried out under pressure in a closed system such as an autoclave. The time for carrying out the hydrolysis treatment may accordingly vary from about 5 minutes to about 5 hours, depending in any particular case on the temperature and the concentration of acid salt employed. Generally speaking, the higher the temperature of hydrolysis the shorter the time required. Also, similarly, the more concentrated the solution of acid salt employed the more rapid the hydrolysis.

The concentration of the acid salt employed in the hydrolyzing treatment is limited to a certain extent by the fact that some of the acid salts may effect a degradation or a discoloration of the polymerized rosin or rosin ester in the more concentrated forms in the elevated temperatures of treatment. However, it has been found that by using a concentration of acid salt not in excess of about 60% by weight and a temperature not above about 200° C. that substantially no degradation or discoloration of the polymerized material occurs. It has also been found that within these limits substantially no hydrolysis of the ester group in polymerized rosin esters occurs, thereby making the defined process generally applicable to both polymerized rosins and rosin esters. The use of an inert atmosphere during the hydrolysis treatment is contemplated since by this means it is possible to avoid any color degradation of the polymerized materials. For this purpose the inert atmosphere may be provided by gases as carbon dioxide, nitrogen, etc.

In the polymerization of rosin or rosin esters with acids such as concentrated sulfuric acid, a homogeneous or a heterogeneous reaction mixture is obtained depending on the particular organic solvent used for dissolving the rosin material and upon the concentration of rosin in the solvent. Thus with solvents such as benzene, toluene or gasoline a sludge separates from the solution using rosin concentrations up to about 50%, such a sludge consisting of association or addition products of the sulfuric acid with the rosin material. Addition of water to such a heterogeneous polymerization mixture serves to break up such sludge and to divert the combined rosin into the organic solvent and the sulfuric acid into the acid layer. If desired, the sludge may be separated to facilitate production of a lighter colored polymerized product. With the polymerized rosin or rosin ester solution obtained in this manner the hydrolysis treatment may be conveniently carried out by heating the separated polymerized rosin solution with the aqueous solution of the acid salt, with suitable agitation at a temperature and for a time sufficient to effect a break-up of any addition product of the sulfuric acid with the rosin or rosin ester such as in the ranges defined above.

On completion of the hydrolysis treatment the aqueous solution of the acid salt used in the hydrolysis may be drawn off from the polymerized rosin or rosin ester solution and the polymerized material subjected to successive washings with water to remove the last traces of acid and acid salt. A small amount of a neutral salt such as sodium chloride may be included in the wash water to effect a more rapid separation of the two layers. Thus a 1 or 2% sodium chloride solution provides an effective washing medium. The washing operation may be effected in considerably less time than is possible without the prior hydrolysis treatment and a more efficient separation of the polymerized rosin or rosin ester solution is obtained.

The following examples illustrate the effect of the hydrolysis treatment described in accordance with this invention in the purification of polymerized rosins and rosin esters. In the examples all parts expressed are by weight unless otherwise designated.

*Example 1*

To a solution of 800 parts of N wood rosin in 1200 parts of benzene, 200 parts of 95% sulfuric acid were added with vigorous agitation during a period of about 10 minutes at a temperature of 15–22° C. Agitation was then continued for 80 minutes at 20° C., and the mixture then allowed to stand another 15 minutes at 20° C. The benzene solution was then decanted from the acid sludge. The benzene solution of polymerized rosin thus obtained was divided into three equal portions. The first portion was subjected to a hydrolysis treatment with 600 parts of an 8.3% aqueous solution of potassium acid sulfate by heating at 80° C. with agitation for 1 hour. The acid salt layer was then separated and the benzene solution divided into two parts for washing. One part was washed three consecutive times with one thousand-part portions of water at a temperature of 25–30° C., and permitting the mixture to stand after each wash until satisfactory separation could be effected. The other part was washed similarly with one thousand-part portions of water containing 1% sodium chloride.

The second portion of the benzene solution of polymerized rosin was subjected to a hydrolysis treatment with 600 parts of an 8.3% aqueous solution of monosodium acid phosphate

($NaH_2PO_4 \cdot H_2O$)

by heating at 80° C. with agitation for 1 hour. After separation of the acid salt layer, the benzene solution was divided into two parts and one part washed as above with one thousand-part portions of water while the other part was washed similarly with one thousand-part portions of water containing 1% sodium chloride.

The third portion of the benzene solution of polymerized rosin was not subjected to a hydrolysis treatment but was divided into two parts and one part washed directly at 25–30° C. with three consecutive one thousand-part portions of water while the other part was washed similarly with three consecutive one thousand-part portions of water containing 1% sodium chloride.

In Table 1 below, the time required for separation of each wash solution and the analysis of the polymerized rosin obtained after evaporation of the solvent in each case are shown.

|  | Separation time | | |
|---|---|---|---|
|  | No hydrolysis | Hydrolysis $KHSO_4$ | Hydrolysis $NaH_2PO_4$ |
| First wash: |  |  |  |
|   No NaCl_____minutes__ | [1] 15 | 15 | [1] 15 |
|   1% NaCl_____do____ | 15 | 4 | 15 |
| Second wash: |  |  |  |
|   No NaCl_____do____ | 15 | 12 | 15 |
|   1% NaCl_____do____ | 15 | 4 | 5 |
| Third wash: |  |  |  |
|   No NaCl_____do____ | 15 | 15 | 15 |
|   1% NaCl_____do____ | 15 | 3 | 8 |
| Analysis: |  |  |  |
|   Acid number_____ | 164 |  |  |
|   Melting point_____° C__ | 104 |  |  |
|   Color_____ | K | K | K |
|   S _____per cent__ | 0.04 | 0.018 | 0.018 |

[1] Not completely separated.

*Example 2*

To a solution of 300 parts of K wood rosin in 560 parts of benzene, 70 parts of 95% sulfuric acid were added with vigorous agitation during a period of about 10 minutes at a temperature of 20° C. Agitation was then continued for ½ hour at 18–20° C. and the mixture then allowed to stand another 15 minuutes. The benzene solution was then decanted from the acid sludge. The benzene solution was divided into two equal portions. One portion was subjected to a hydrolysis treatment by heating with 225 parts of an 8% aqueous solution of sodium acid sulfate by heating at 80° C. with agitation for one hour. The acid salt layer was then separated and the benzene solution washed three consecutive times with one thousand-part portions of water containing 2% sodium chloride. The second portion of the benzene solution of polymerized rosin was not subjected to a hydrolysis treatment but was washed directly with three consecutive one thousand-part portions of water containing 2% sodium chloride.

In Table 2 below, the time required for separation of each wash solution in minutes is shown.

|  | Separation time (minutes) | |
|---|---|---|
|  | No hydrolysis | Hydrolysis $NaHSO_4$ |
| First wash—2% NaCl_____ | [1] 16 | 3 |
| Second wash—2% NaCl_____ | [1] 5 | 3 |
| Third wash—2% NaCl_____ | [1] 30 | 3.5 |

[1] Both layers opaque.

It will be readily apparent from the above examples that the hydrolysis treatment described in accordance with this invention makes it possible to remove acid catalysts from polymerized rosin or rosin ester solutions in a much more efficient manner. Thus the examples illustrate that a cleaner separation and a more rapid separation of the wash solutions from the polymerized rosin or rosin ester solutions is possible by subjecting the polymerized rosin or rosin ester solution to the described hydrolysis treatment prior to water washing. By use of such a hydrolysis procedure it is now possible to satisfactorily wash such polymerized rosin or rosin ester solutions conveniently and effectively to remove the last traces of acid catalyst therefrom. The hydrolysis treatment also makes it commercially practical to polymerize rosin with strong polybasic mineral acid catalysts. The hydrolysis treatment also makes it possible to produce a sulfuric acid polymerized rosin or rosin ester which will contain less combined sulfur than has been possible by any previously known purification procedure.

Although the specific examples shown above illustrate the process of the invention in terms of a batch procedure it will be obvious that the hydrolysis treatment can also be carried out in a continuous manner, for example, by passing the polymerized rosin solutions and the hydrolyzing acid salt solution concurrently through a contact chamber or tube, or by passing the polymerized rosin solution up through the hydrolyzing acid salt solution, or by passing a solution of the polymerized rosin or rosin ester and the hydrolyzing acid salt solution countercurrently through any suitable device, as well as by other procedures which will be apparent to those skilled in the art. Also, the hydrolysis treatment may be included as a step in the continuous polymerization of rosin by the process utilizing a sulfuric acid sludge catalyst, such as is described in U. S. Patent 2,283,659 to Clell E. Tyler.

This application forms a continuation-in-part of my application, Serial No. 371,990, filed December 27, 1940, now U. S. Patent 2,300,065.

What I claim and desire to protect by Letters Patent is:

1. In the polymerization of a material selected from the group consisting of rosins and rosin esters with a polymerization catalyst selected from the group consisting of strong polybasic mineral acids and acidic organic substituted polybasic mineral acids, the step in the purification which comprises hydrolyzing the polymerized material prior to water washing with an aqueous solution of an acid salt of an inorganic acid to effect substantially complete hydrolysis of any addition product formed by combination of the polymerization catalyst with the rosin or rosin ester material.

2. In the polymerization of a material selected from the group consisting of rosins and rosin esters with a polymerization catalyst selected from the group consisting of strong polybasic mineral acids and acidic organic substituted polybasic mineral acids, the step in the purification which comprises hydrolyzing the polymerized material prior to water washing with an aqueous solution of an acid salt of an inorganic acid at a temperature within the range of about 50° C. to about 200° C. to effect substantially complete hydrolysis of any addition product formed by combination of the polymerization catalyst with the rosin or rosin ester material.

3. In the polymerization of a material selected from the group consisting of rosins and rosin esters with a polymerization catalyst selected from the group consisting of strong polybasic mineral acids and acidic organic substituted polybasic mineral acids, the step in the purification which comprises hydrolyzing the polymerized material prior to water washing with an aqueous solution of an acid salt of an inorganic acid having a concentration up to about 60 per cent by weight at a temperature within the range of about 50° C. to about 200° C. to effect substantially complete hydrolysis of any addition product formed by combination of the polymerization catalyst with the rosin or rosin ester material.

4. In the polymerization of rosin with a polymerization catalyst selected from the group consisting of strong polybasic mineral acids and acidic organic substituted polybasic mineral acids, the step in the purification which comprises hydrolyzing the polymerized rosin prior to water washing with an aqueous solution of an acid salt of an inorganic acid having a concentration up to about 60 per cent by weight at a temperature within the range of about 50° C. to about 200° C. to effect substantially complete hydrolysis of any addition product formed by combination of the polymerization catalyst with the rosin or rosin ester.

5. In the polymerization of rosin with sulfuric acid as a polymerization catalyst, the step in the purification which comprises hydrolyzing the polymerized rosin prior to water washing with an aqueous solution of an acid salt of an inorganic acid having a concentration up to about 60 per cent by weight at a temperature within the range of about 50° C. to about 200° C. for a sufficient time to effect substantially complete hydrolysis of any addition product formed by combination of the sulfuric acid with the rosin material.

6. In the polymerization of rosin with phosphoric acid as a polymerization catalyst, the step in the purification which comprises hydrolyzing the polymerized rosin prior to water washing with an aqueous solution of an acid salt of an inorganic acid having a concentration up to about 60 per cent by weight at a temperature within the range of about 50° C. to about 200° C. for a sufficient time to effect substantially complete hydrolysis of any addition product formed by combination of the phosphoric acid with the rosin material.

7. In the polymerization of rosin with tetraphosphoric acid as a polymerization catalyst, the step in the purification which comprises hydrolyzing the polymerized rosin prior to water washing with an aqueous solution of an acid salt of an inorganic acid having a concentration up to about 60 per cent by weight at a temperature within the range of about 50° C. to about 200° C. for a sufficient time to effect substantially complete hydrolysis of any addition product formed by combination of the tetraphosphoric acid with the rosin material.

8. In the polymerization of rosin dissolved in a solvent therefor with a concentrated sulfuric acid catalyst, the step in the purification which comprises hydrolyzing the polymerized rosin solution prior to water washing with an aqueous solution of an acid salt of an inorganic acid having a concentration up to about 60 per cent by weight at a temperature within the range of about 50° C. to about 200° C. to effect substantially complete hydrolysis of any addition product formed by combination of the sulfuric acid with the rosin material.

9. In the polymerization of rosin dissolved in a solvent therefor with a concentrated sulfuric acid catalyst, the step in the purification which comprises hydrolyzing the polymerized rosin solution prior to water washing with an aqueous solution of sodium acid sulfate having a concentration up to about 60 per cent by weight at a temperature within the range of about 50° C. to about 200° C. to effect substantially complete hydrolysis of any addition product formed by combination of the sulfuric acid with the rosin material.

10. In the polymerization of rosin with sulfuric acid as a polymerization catalyst, in which the polymerization is carried out in a solvent and under conditions which provide a heterogeneous polymerization mixture, the steps in the purification which comprise diluting the polymerization mixture with water, separating the polymerized rosin solution from the acid layer and heating the separated polymerized rosin solution at a temperature within the range of about 50° C. to about 200° C. with an aqueous solution of an acid salt of an inorganic acid for a time which is sufficient to effect substantially complete hydrolysis of any addition product formed by combination of the sulfuric acid with the rosin material.

11. In the polymerization of rosin dissolved in a solvent therefor with a concentrated sulfuric acid catalyst, the step in the purification which comprises hydrolyzing the polymerized rosin prior to water washing with an aqueous solution of sodium acid sulfate having a concentration up to about 60 per cent by weight at a temperature within the range of about 50° C. to about 100° C. for a time which is sufficient to effect substantially complete hydrolysis of any addition product formed by combination of the polymerization catalyst with the rosin material.

12. In the polymerization of rosin dissolved in benzol with a concentrated sulfuric acid catalyst, the step in the purification which comprises hydrolyzing the polymerized rosin prior to water washing with an aqueous solution of sodium acid sulfate having a concentration up to about 60 per cent by weight at a temperature within the range of about 50° C. to about 100° C. for a time which is sufficient to effect substantially complete hydrolysis of any addition product formed by combination of the polymerization catalyst with the rosin material.

13. In the polymerization of rosin dissolved in a solvent therefor with a concentrated sulfuric acid catalyst, the step in the purification which comprises hydrolyzing the polymerized rosin solution prior to water washing with an aqueous solution of potassium acid sulfate having a concentration up to about 60 per cent by weight at a temperature within the range of about 50° C. to about 200° C. to effect substantially complete hydrolysis of any addition product formed by combination of the sulfuric acid with the rosin material.

14. In the polymerization of rosin dissolved in a solvent therefor with a concentrated sulfuric acid catalyst, the step in the purification which comprises hydrolyzing the polymerized rosin solution prior to water washing with an aqueous solution of monosodium acid phosphate having a concentration up to about 60 per cent by weight at a temperature within the range of about 50° C. to about 200° C. to effect substantially complete hydrolysis of any addition product formed by combination of the sulfuric acid with the rosin material.

ALFRED L. RUMMELSBURG.